H. HARVEY.
Improvement in Bee-Hives.
No. 115,849.　　　　　　　　　　Patented June 13, 1871.
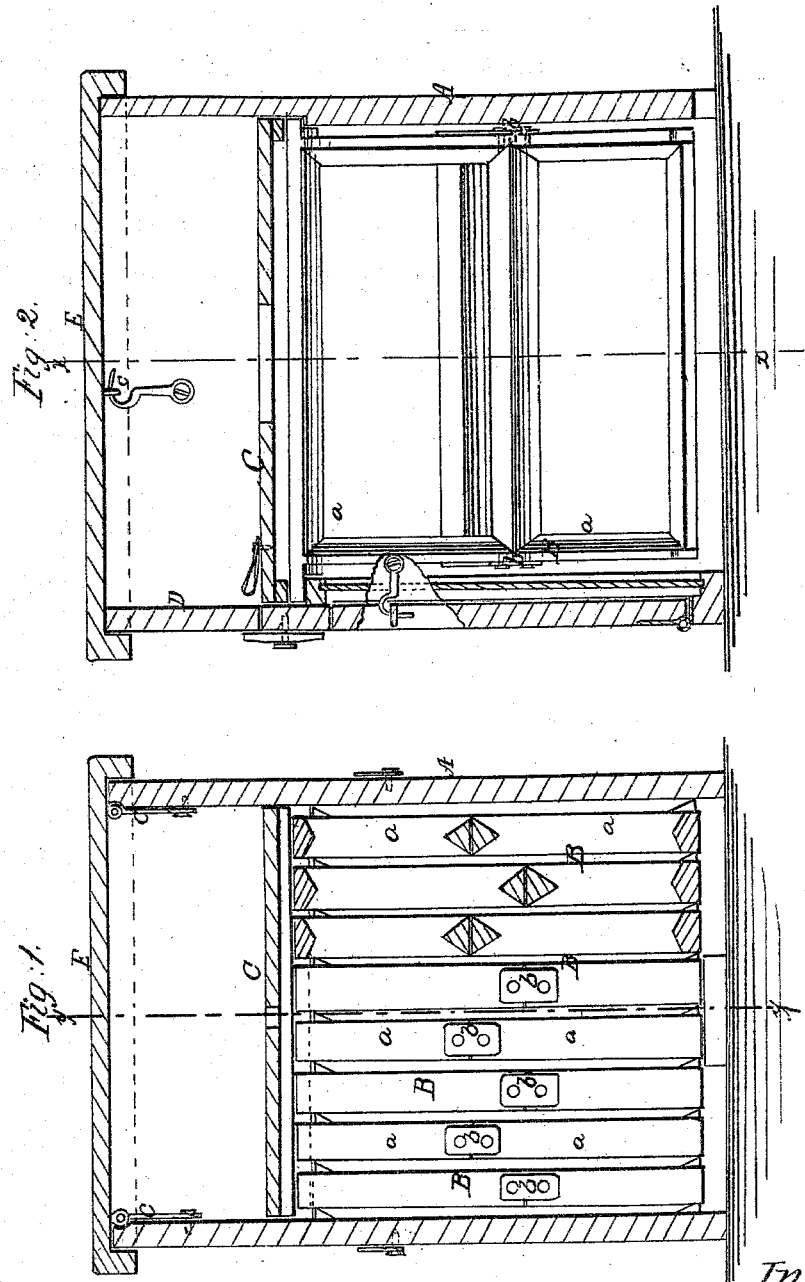
Witnesses:
Inventor:

UNITED STATES PATENT OFFICE.

H. HARVEY, OF MERIDEN, ILLINOIS.

IMPROVEMENT IN BEE-HIVES.

Specification forming part of Letters Patent No. 115,849, dated June 13, 1871.

*To all whom it may concern:*

Be it known that I, H. HARVEY, of Meriden, in the county of La Salle and State of Illinois, have invented a new and useful Improvement in Bee-Hives; and I do hereby declare that the following is a full, clear, and exact description thereof, which will enable others skilled in the art to make and use the same, reference being had to the accompanying drawing forming part of this specification, in which—

Figure 1 is a vertical section of my invention taken in the line $x\ x$ of Fig. 2. Fig. 2 is a vertical section of the same taken in the line $y\ y$, Fig. 1.

Similar letters of reference indicate like parts.

The invention relates to bee-hives; and consists in combining sectional and vertically-suspended comb-frames with the other parts of the hive, so that the upper sections having the pure honey thereon may be lifted, detached, and replaced without changing the boxes.

In the accompanying drawing, A represents the body or box of the hive, which is of quadrilateral form, and is provided with comb-frames B, suspended in the hive in any proper manner. These comb-frames may be of the usual rectangular form, and they are constructed each of two equal parts, $a\ a$, connected together at their front and rear ends by strips $b$ of tin or thin sheet metal, one end of which is tacked to the upper and the other to the lower parts of the frames. (See more particularly Fig. 1.) On the top of the frames B a lid, C, is placed loosely, so that it may be readily raised or lifted when required; and one side of the box A above the comb-frames is made detachable, or like a door, D, so that it may be removed, the lid C raised and taken out of the box, and then any desired number of the comb-frames may be raised, and the upper parts, which are filled with honey, detached, and empty corresponding parts attached in their place. These frames may then be readjusted in proper position, the lid C replaced, and the door D fitted to the box.

The upper parts of comb-frames generally contain pure honey, and consequently by my improvement honey may be taken directly from the hive, and spare honey-boxes dispensed with, which is a material advantage, as bees will make more honey in the hive—that is to say, a greater quantity of surplus honey may be obtained from within the hive than can be obtained by the application of spare honey-boxes, as bees have a greater propensity to work and replace honey taken from the hive than to work in spare honey-boxes above the comb-frames.

The lid or top E of the hive is held in place by hooks and eyes $e$, or other suitable fastenings, and this lid or top, when the door D is taken out, is unhooked and removed, and the frames B may then be lifted entirely out of the hive, and their upper parts $a$ detached without any trouble or difficulty whatever.

Having thus described my invention, I claim as new and desire to secure by Letters Patent—

The metal strip $b$, combined, as described, with the double comb-frames B, for the purpose specified.

H. HARVEY.

Witnesses:
   A. P. DARROW,
   S. M. SHAW.